(12) United States Patent
Kim et al.

(10) Patent No.: US 10,101,958 B2
(45) Date of Patent: Oct. 16, 2018

(54) DISPLAY DEVICE AND MULTI DISPLAY DEVICE COMPRISING THE SAME

(71) Applicant: LG Display Co., Ltd., Seoul (KR)

(72) Inventors: TaeJin Kim, Paju-si (KR); JeongJo Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 134 days.

(21) Appl. No.: 15/262,734

(22) Filed: Sep. 12, 2016

(65) Prior Publication Data

US 2017/0083273 A1    Mar. 23, 2017

(30) Foreign Application Priority Data

Sep. 18, 2015 (KR) ............... 10-2015-0132593

(51) Int. Cl.
| | |
|---|---|
| H05K 5/00 | (2006.01) |
| H05K 5/02 | (2006.01) |
| G06F 3/14 | (2006.01) |
| G09G 3/34 | (2006.01) |
| G02F 1/13 | (2006.01) |

(52) U.S. Cl.
CPC .............. G06F 3/1446 (2013.01); G02F 1/13 (2013.01); G09G 3/3406 (2013.01); G09G 2300/026 (2013.01)

(58) Field of Classification Search
CPC ... G06F 1/616; G02F 1/33308; H04M 1/0216
USPC .................. 361/679.01–679.03, 807, 810
See application file for complete search history.

(56) References Cited

U.S. PATENT DOCUMENTS

| | | | | |
|---|---|---|---|---|
| 2011/0310543 A1* | 12/2011 | Kim | ................ | G02F 1/133308 361/679.01 |
| 2012/0236484 A1* | 9/2012 | Miyake | ................ | G06F 1/1616 361/679.01 |
| 2013/0010405 A1* | 1/2013 | Rothkopf | ............ | H04M 1/0216 361/679.01 |
| 2015/0086433 A1* | 3/2015 | Niaz | ..................... | F01N 3/2892 422/168 |
| 2015/0163928 A1* | 6/2015 | Cho | .................. | G02F 1/133608 362/97.1 |

* cited by examiner

Primary Examiner — Tuan T Dinh
(74) Attorney, Agent, or Firm — Fenwick & West LLP

(57) ABSTRACT

A display device comprises a display panel comprising signal lines and configured to display images; a panel support frame coupled to at least a bottom surface of the display panel to support the display panel; a plurality of guide protrusions inserted at predetermined locations of the panel support frame, each of the plurality of guide protrusions including an insertion groove open to receive a guide member configured to connect the display device with another display device; a driving circuit arranged at one side of the panel support frame; a cover shield covering the driving circuit at the side of the panel support frame; and a side cover film covering the cover shield located at the side of the panel support frame, the side cover film including a plurality of guide holes that are each aligned with a corresponding one of the plurality of guide protrusions.

19 Claims, 8 Drawing Sheets

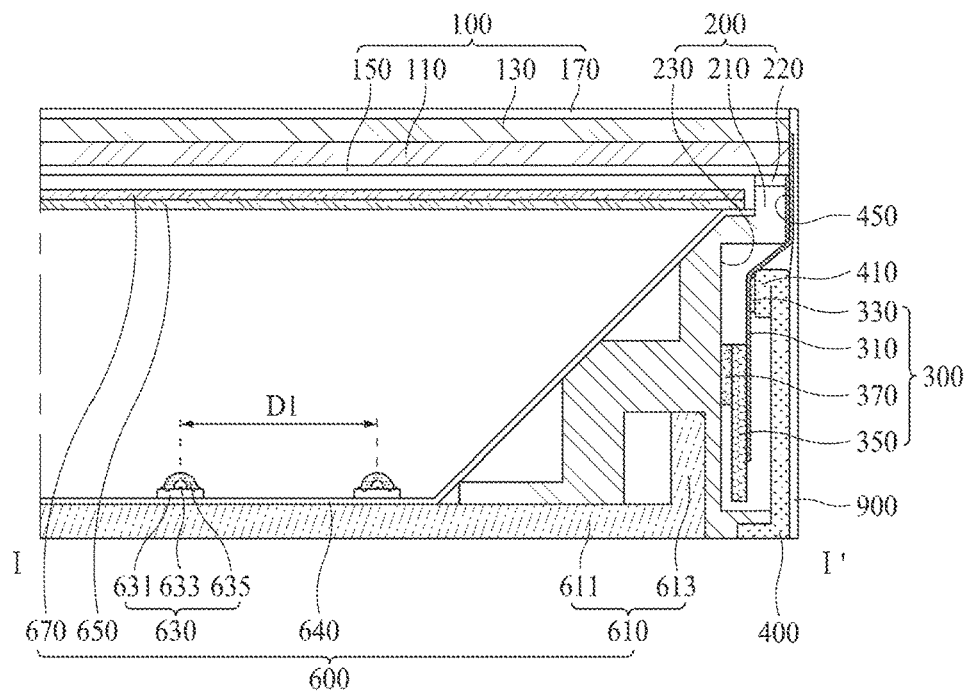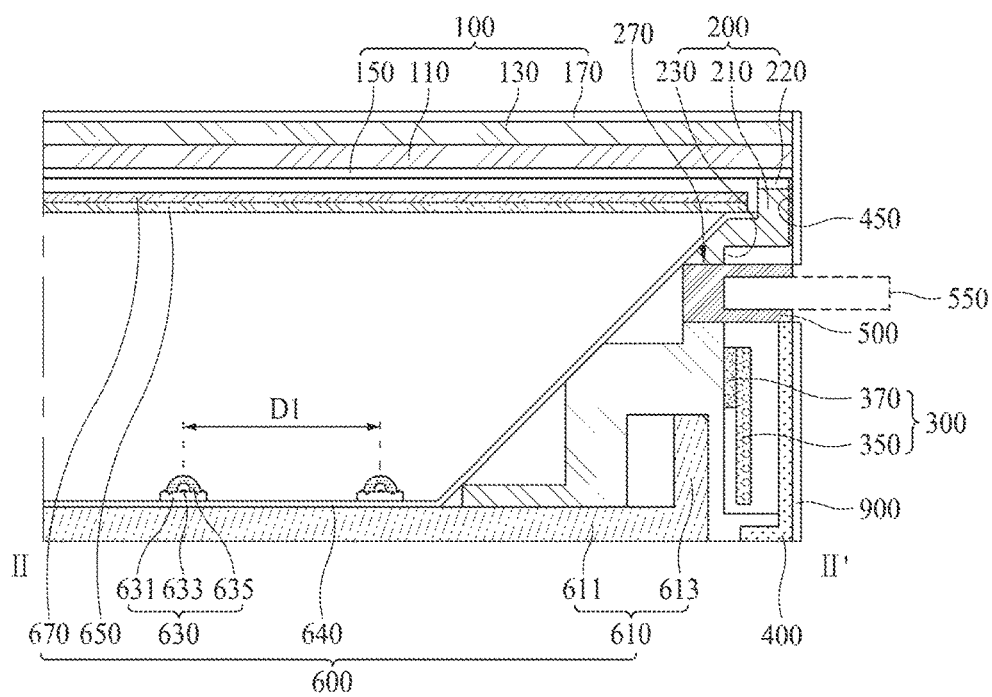

DISPLAY DEVICE AND MULTI DISPLAY DEVICE COMPRISING THE SAME

CROSS REFERENCE TO RELATED APPLICATIONS

This application claims the benefit of Republic of Korea Patent Application No. 10-2015-0132593 filed on Sep. 18, 2015, which is hereby incorporated by reference for all purposes as if fully set forth herein.

BACKGROUND

Field of Technology

The present disclosure relates to a display device and a multi display device comprising the same.

Discussion of the Related Art

Display devices such as a liquid crystal display device, a plasma display panel, and an organic light emitting display device have been developed up to now.

The display device includes a display panel for displaying an image, and a driving circuit for driving the display panel.

FIG. 1 is a brief view illustrating a display device according to the related art.

Referring to FIG. 1, the display device according to the related art includes a display panel 10, a driving circuit 30, and a front case 50.

The display panel 10 displays a predetermined image by controlling transmittance of light emitted from a plurality of light sources. To this end, the display panel 10 includes a lower substrate 13 and an upper substrate 15.

The lower substrate 13 is provided with various signal lines (not shown), and a signal pad 17 is provided at an end of the signal lines.

The upper substrate 15 is bonded to the lower substrate 13, but not to the signal pad 17 of the lower substrate 13 by interposing a liquid crystal layer (not shown) there between. Therefore, the upper substrate 15 is formed to have a size smaller than that of the lower substrate 13. The upper substrate 15 is provided with color filters formed to correspond to respective pixels, and may additionally be provided with a common electrode to which a common voltage is applied in accordance with a driving mode of the liquid crystal layer.

The driving circuit 30 is connected with the signal pad 17 to drive the display panel 10. The driving circuit 30 includes a flexible circuit film 31, a driving integrated circuit 33, and a printed circuit board 35.

The flexible circuit film 31 is attached to an upper surface of the signal pad 17 which is exposed.

The driving integrated circuit 33 is attached to an upper surface of the flexible circuit film 31. This driving integrated circuit 33 may have a chin on film (COF) structure.

The printed circuit board 35 applies various signals to the display panel 10 through the flexible circuit film 31. To this end, the printed circuit board 35 is in contact with the flexible circuit film 11.

The front case 50 covers a front edge portion of the display panel 10 and the driving circuit 30.

In the aforementioned display device of the related art, the front case 50 is provided to surround the signal pad 17 and the driving circuit 30. In this case, a bezel area of the display device may be increased.

Recently, a multi display device has been developed, which realizes a large-sized display by arranging a plurality of display devices in a tile pattern. If the bezel area of the display device is increased, an external esthetic sense of the multi display device is deteriorated.

The aforementioned background art is technical information owned by the inventor of this application to devise the present invention or acquired during the devising procedure of the present invention, and is not always considered as the known art disclosed to the general public prior to filing of the present invention.

SUMMARY

Accordingly, the present disclosure is directed to a display device and a multi display device comprising the same, which substantially obviate one or more problems due to limitations and disadvantages of the related art.

An advantage of the present invention is to provide a display device provided with guide protrusions, which may reduce a bezel area and improve assembly accuracy of a cover shield, and a multi display device comprising the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to the present disclosure comprises a display panel comprising signal lines and configured to display images; a panel support frame coupled to at least a bottom surface of the display panel to support the display panel; a plurality of guide protrusions inserted at predetermined locations of the panel support frame, each of the plurality of guide protrusions including an insertion groove open to receive a guide member configured to connect the display device with another display device; a driving circuit arranged at one side of the panel support frame; a cover shield covering the driving circuit at the side of the panel support frame; and a side cover film covering the cover shield located at the side of the panel support frame, the side cover film including a plurality of guide holes that are each aligned with a corresponding one of the plurality of guide protrusions.

In another aspect of the present disclosure, a multi display device comprises a first display module including a plurality of guide protrusions in at least one side of the first display module, each of the plurality of guide protrusions including an insertion groove; a second display module including a plurality of guide protrusions in at least one side of the second display module, each of the plurality of guide protrusions of the second display module including an insertion groove; and a plurality of guide members connecting together the first display module and the second display module, each guide member including a first end and a second end, the first end of each guide member inserted into one of the plurality of guide protrusions of the first display module and the second end of each guide member inserted into one of the plurality of guide protrusions of the second display module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a cross-sectional view illustrating a section taken along line I-I' shown in FIG. 2 according to one embodiment of the present disclosure;

FIG. 4 is a cross-sectional view illustrating a section taken along line II-II' shown in FIG. 2;

DETAILED DESCRIPTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, preferred embodiments of a display device and a multi display device comprising the same according to the present invention will be described with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
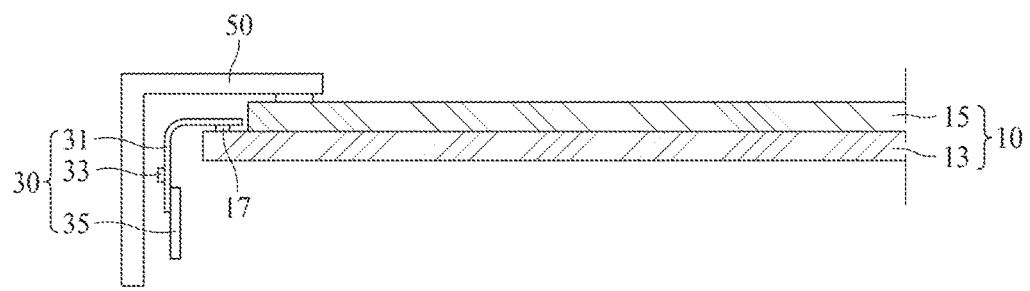
FIG. 1 is a cross-sectional view illustrating a display device of the related art.
Figure 2:
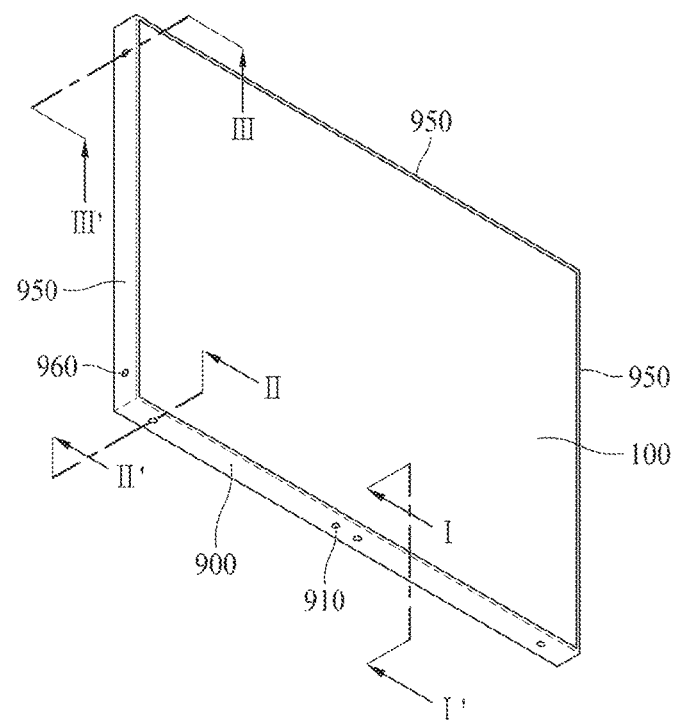
FIG. 2 is a view illustrating a display device according to one embodiment of the present disclosure.
Figure 5:
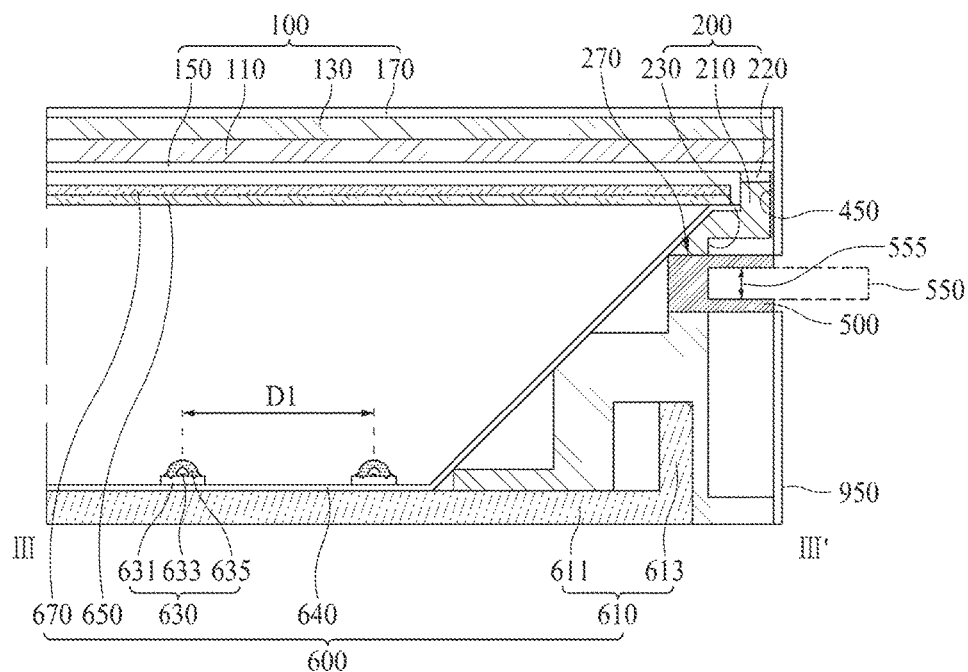
FIG. 5 is a brief cross-sectional view illustrating a section taken along line III-III' shown in FIG. 2 according to one embodiment of the present disclosure.
Figure 6:
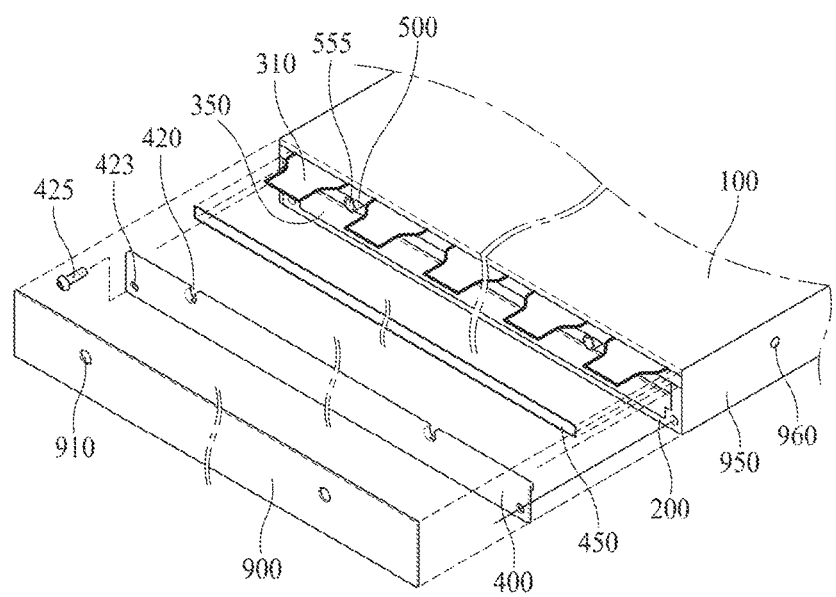
FIG. 6 is an exploded perspective view illustrating a display device according to one embodiment of the present disclosure.

FIG. 2 is a view illustrating a display device according to one embodiment of the present disclosure, FIG. 3 is a cross-sectional view illustrating a section taken along line I-I' shown in FIG. 2, FIG. 4 is a cross-sectional view illustrating a section taken along line II-II' shown in FIG. 2, FIG. 5 is a brief cross-sectional view illustrating a section taken along line III-III' shown in FIG. 2, and FIG. 6 is an exploded perspective view illustrating a display device according to one embodiment of the present disclosure.

Referring to FIGS. 2 to 6, the display device according to one embodiment of the present disclosure includes a display panel 100, a panel support frame 200, a driving circuit 300, a protective film 450, a plurality of guide protrusions 500, a cover shield 400, a side cover film 900, and a backlight unit 600.

The display panel 100 displays a predetermined image by controlling light emitted from a plurality of light sources. To this end, the display panel 100 includes a lower substrate 110, an upper substrate 130, a lower polarizing film 150, and an upper polarizing film 170.

The lower substrate 110 includes a plurality of pixels (not shown) formed per area where a plurality of gate lines (not shown) cross a plurality of data lines (not shown). Each pixel may include a thin film transistor (not shown) connected to the gate lines and the data lines, a pixel electrode connected to the thin film transistor, and a common electrode formed to adjoin the pixel electrode, to which a common electrode is supplied. The lower substrate 110 controls light transmittance of a liquid crystal layer by forming an electric field corresponding to a differential voltage between a data voltage and a common voltage, which are applied to each pixel.

The lower substrate 110 includes signal lines (not shown). The signal lines are connected to the driving circuit 300. The signal lines may be the gate lines and/or the data lines. Also, the signal lines may be extension lines extended from the gate lines and/or the data lines.

The upper substrate 130 is bonded to the lower substrate 110 by interposing the liquid crystal layer (not shown) therebetween. The upper substrate 130 may be provided with color filters corresponding to the respective pixels, and may additionally be provided with a common electrode to which a common voltage is supplied in accordance with a driving mode of the liquid crystal layer.

The lower substrate 110 and the upper substrate 130 may be formed in various types known in the art in accordance with driving modes of the liquid crystal layer, for example, a twisted nematic (TN) mode, a vertical alignment (VA) mode, an in plane switching (IPS) mode, and a fringe field switching (FFS) mode.

The lower polarizing film 150 is attached to a lower surface of the lower substrate 110 to polarize light incident upon the lower substrate 110. At this time, the lower polarizing film 150 may be attached to a full lower area of the lower substrate 110, or may be attached to the other area except a lower edge area of the lower substrate 110.

The upper polarizing film 170 is attached to a front surface of the upper substrate 130 to polarize light emitted to the outside by transmitting the upper substrate 130.

The lower polarizing film 150 and the upper polarizing film 170 have their respective polarizing functions different from each other through elongation processes performed in directions opposite to each other, and have their respective contractile forces in directions opposite to each other due to elongation. Each of the lower polarizing film 150 and the upper polarizing film 170 is attached to each of the lower substrate 110 and the upper substrate 130, whereby each contractile force of the lower polarizing film 150 and the upper polarizing film 170 is counterbalanced. As a result, the display panel 100 forms a flat plane state without being bent upwardly or downwardly.

According to one embodiment of the present disclosure, since the driving circuit 300 connected to the signal line is attached to one side of the lower substrate 110 and the upper substrate 130, it is not required to externally expose the upper surface of the signal line unlike the related art. Therefore, the lower substrate 110 and the upper substrate 130 may be provided to have the same size, and a size of a bezel area may be reduced.

The panel support frame 200 supports a rear (e.g., bottom) edge portion of the display panel 100, and receives the driving circuit 300 therein. The panel support frame 200 includes a sidewall portion 210 and a receiving portion 230.

The sidewall portion 210 supports the rear edge portion of the display panel 100 and an upper portion of the driving circuit 300. In this case, a panel coupling member 220 may be provided between the sidewall portion 210 and the display panel 100. Since the panel coupling member 220 is provided, the display panel 100 may stably be fixed on the sidewall portion 210. The panel coupling member 220 may be an optical hardening adhesive, a thermal hardening adhesive, a double-sided tape, or a double-sided adhesive pad.

The receiving portion 230 is provided at an outer side of the sidewall portion 210. The receiving portion 230 receives a lower portion of the driving circuit 300. To this end, the receiving portion 230 is concavely provided at an outer side of the panel support frame 200.

Additionally, the panel support frame 200 according to one embodiment of the present disclosure further includes a plurality of protrusion holders 270. The plurality of protrusion holders 270 are provided in the receiving portion 230 overlapped between the plurality of flexible circuit films 310. In this case, the plurality of flexible circuit films 310 are arranged to be spaced apart from each other at a certain interval, and the plurality of protrusion holders 270 are provided between the plurality of flexible circuit films 310 spaced apart from each other. Therefore, the plurality of protrusion holders 270 are not overlapped with the plurality of flexible circuit films 310.

A plurality of guide protrusions 500 are inserted into the plurality of protrusion holders 270 formed in the panel support frame 200. Therefore, the plurality of guide protrusions 500 are fixed to the panel support frame 200. Thus, the plurality of guide protrusions 500 are inserted at predetermined locations of the panel support frame 200. The plurality of protrusion holders 270 may be, but not limited to, through holes provided in the receiving portion 230.

The driving circuit 300 is arranged at one side of the display panel 100, and is connected with the signal line. The upper portion of the driving circuit 300 is supported in the sidewall portion 210 and electrically connected with the signal line. Also, the lower portion of the driving circuit 300 is received in the receiving portion 230 and connected to the cover shield 400.

The driving circuit 300 includes a plurality of flexible circuit films 310, a driving integrated circuit 330, and a printed circuit board 350.

The plurality of flexible circuit films 310 are connected with the signal line by being attached to one side of the display panel 100. That is, the plurality of flexible circuit films 310 are attached to the sides of the lower substrate 110 and the upper substrate 120 in accordance with a side bonding manner. An upper portion of each of the flexible circuit films 310 is supported in the outer side of the sidewall portion 210 of the panel support frame 200. A lower portion of each of the flexible circuit films 310 is bent from its upper portion and received in the receiving portion 230.

In the display device according to one embodiment, since the plurality of flexible circuit films 310 are attached to one side of the display panel 100, it is not required to externally expose the signal line unlike the related art. Therefore, the bezel area may be reduced as compared with the display device of the related art.

The driving integrated circuit 330 is packaged in the upper surface of the plurality of flexible circuit films 310. The driving integrated circuit 330 is received in the receiving portion 230 and is in contact with the cover shield 400. The driving integrated circuit 330 may be packaged in, but not limited to, a chip on film (COF).

The printed circuit board 350 is received in the receiving portion 230 and connected to the plurality of flexible circuit films 310. The printed circuit board 350 applies various signals required for driving of the display panel 100 to each of the flexible circuit films 310.

A substrate support member 370 for supporting the printed circuit board 350 may be provided between the printed circuit board 350 and the receiving portion 230. The substrate support member 370 is provided on the bottom of the receiving portion 230 and supports the printed circuit board 350.

The protective film 450 is attached to one side of the panel support frame 200 to support the upper portion of each of the plurality of flexible circuit films 310. The protective film 450 is guided by the plurality of guide protrusions 500 and attached to the outer side of the sidewall portion 210 of the panel support frame 200. In this case, the protective film 450 is not overlapped with the guide protrusions 500.

According to one embodiment, since the protective film 450 is provided between the panel support frame 200 and the plurality of flexible circuit films 310, the plurality of flexible circuit films 310 may be prevented from being damaged by the panel support frame 200.

Each of the plurality of guide protrusions 500 is provided at one side of the panel support frame 200 corresponding between the plurality of flexible circuit films 310. Each of the plurality of guide protrusions 500 is inserted into each of the plurality of protrusion holders 270 provided in the receiving portion 230. The plurality of guide protrusions 500 have an insertion groove 555 concavely provided toward an inner side of the panel support frame 200. The insertion groove 555 receive a guide member 550 in order to guide the protective film 450, the cover shield 400, and the side cover film 900 during assembly of the display device.

The plurality of guide protrusions 500 are arranged between the protective film 450 and the printed circuit board 350 to guide the attachment position of the protective film 450. Since the plurality of guide protrusions 500 guide the attachment position of the protective film 450, the protective film 450 may accurately be attached to one side of the panel support frame 200.

Each of the plurality of guide protrusions 500 passes through the cover shield 400 to guide the cover shield 400 so that the cover shield 400 may easily be assembled in the panel support frame 200. That is, if a fastening member 425 is inserted into a fastening hole 423 to fix the cover shield 400 to the panel support frame 200, the cover shield 400 may be distorted. To prevent the cover shield 400 from being distorted, in one embodiment, after the cover shield 400 is primarily fixed to the panel support frame 200 by the plurality of guide protrusions 500, the cover shield 400 and the panel support frame 200 are fastened to each other. In this case, the cover shield 400 may be coupled with the panel support frame 200 more easily.

The plurality of guide protrusions 500 guide the attachment position of the side cover film 900 so that the side cover film 900 is not protruded toward the upper surface of the display panel 100 and the lower surface of the cover shield 400. In this case, a guide member 550 may be inserted into each of the plurality of guide protrusions 500. The inserted guide member 550 guides the side cover film 900 by passing through a guide hole 910 provided in the side cover film 900. Therefore, the side cover film 900 may accurately be attached without being protruded toward the upper surface of the display panel 100 and the lower surface of the cover shield 400. In one embodiment, each guide member 550 is cylindrically shaped and has a first end and a second end that are respectively inserted into different display devices to connect together the display devices.

The plurality of guide protrusions 500 may additionally be provided at the other sides except one side of the panel support frame 200. The additionally provided guide protrusions 500 may provide the same effect as that of the guide protrusions 500 provided at one side of the panel support frame 200.

The guide member 550 according to one embodiment is removed after guiding the protective film 450 and the side cover film 900, and is shown in a dotted line in the drawing of the present disclosure. The guide member 550 will be described later through the process of attaching the protective film 450 and the side cover film 900 and the process of assembling the cover shield 400.

The cover shield 400 is provided at one side of the panel support frame 200. The lower portion of the cover shield 400 is fastened with the panel support frame 200. The cover shield 400 receives the lower portion of each of the plurality of flexible circuit films 310 and the printed circuit board 350 in the receiving portion 230. The cover shield 400 includes a pressurizing protrusion 410.

The pressurizing protrusion 410 is bent toward the receiving portion 230. The pressurizing portion 410 presses the lower portion of each of the plurality of flexible circuit films 310 so that the driving circuit 300 may be arranged in the receiving portion 230. Each of the plurality of flexible circuit films 310 is bent by the pressurizing protrusion 410 and stably received in the receiving portion 230. In this specification, the pressurizing protrusion 410 bent toward the receiving portion 230 has been exemplarily described, but not limited to the present disclosure. The pressurizing portion 410 may have a shape protruded toward the receiving portion 230.

Additionally, the cover shield 400 may further include a plurality of through portions 420. Each of the plurality of through portions 420 is overlapped with each of the plurality of guide protrusions 500. Each of the plurality of through portions 420 passes through each of the plurality of guide protrusions 500. Therefore, the cover shield 400 may primarily be fixed to the panel support frame 200.

According to one embodiment, after the cover shield 400 is primarily fixed to the panel support frame 200, the fastening hole 423 and the fastening member 425 of the cover shield 400 are fastened to each other, whereby the cover shield 400 is assembled in the panel support frame 200. Therefore, distortion of the cover shield 400, which is caused during the process of assembling the cover shield 400 and the panel support frame 200, may be avoided.

The side cover film 900 is arranged at one side of the panel support frame 200. The side cover film 900 covers one side of the display panel 100, the plurality of flexible films 310, and the cover shield 400. The side cover film 900 prevents external light from entering the display device and at the same time prevents light leakage from being generated at a joint portion of the display device. Since the side cover film 900 surrounds the side of the display module, esthetic appearance of the display device may be improved.

The side cover film 900 has a plurality of guide holes 910. Each of the plurality of guide holes 910 is overlapped with each of the plurality of guide protrusions 500. The guide member 550 may pass through the plurality of guide holes 810. When the side cover film 900 is attached to one side of the display panel 100, the plurality of flexible circuit films 310 and the cover shield 400, the inserted guide member 550 guides the side cover film 900. Therefore, the side cover film 900 is accurately attached without being protruded toward the upper surface of the display panel 100 and the lower surface of the cover shield 400.

Additionally, the display device according to one embodiment of the present disclosure further includes a plurality of auxiliary side cover films 950. The plurality of auxiliary side cover films 950 additionally cover the other sides except one side of the panel support frame 200. Also, the auxiliary side cover films 950 cover the other sides except one side of the display panel 100 to which the side cover film 900 is attached.

In this case, each of the plurality of auxiliary side cover films 950 has a plurality of auxiliary guide holes 960. Each of the plurality of auxiliary guide holes 960 is overlapped with each of the plurality of guide protrusions 500 additionally provided at the other sides except one side of the panel support frame 200. Each of the plurality of auxiliary side cover films 950 may be made of the same film as the side cover film 900, and may provide the same effect as that of the side cover film 900.

The backlight unit 600 includes a rear cover 610, a plurality of light source modules 630, a reflective sheet 640, a diffusion sheet 650, and an optical sheet portion 670.

The rear cover 610 is arranged below the display panel 100 and coupled to the panel support frame 200. The rear cover 610 according to one embodiment is formed to include a receiving space formed concavely to have a certain height, and receives the plurality of light source modules 630 therein. For example, the rear cover 610 may include a bottom support 611 and a cover sidewall 613.

The bottom support 611 is formed to face the other portion except the edge portion of the display panel 100, and supports the plurality of light source modules 630.

The cover sidewall 613 is bent at a certain height from each side of the bottom support 611 to surround an upper portion of the bottom support 611 and forms a receiving space on the bottom support 611. In this case, the cover sidewall 613 may be formed to be inclined at a certain angle from each side of the bottom support 611. The cover sidewall 613 is fastened to the lower surface of the panel support frame 200.

Therefore, the bottom support 611 of the rear cover 610 and an inner inclined surface of the panel support frame 200 are arranged to be adjacent to each other.

The plurality of light source modules 630 are arranged at the bottom support 611 of the rear cover 610 to have a certain interval D1 and irradiates light to the diffusion sheet 650. The plurality of light source modules 630 according to one embodiment include a light source printed circuit board 631, a point light source package 633, and a light diffusion lens 635.

The light source printed circuit board 631 is arranged at the bottom support 611 of the rear cover 610 to have a certain interval. A backlight driving signal line and a connector are packaged in the light source printed circuit board 631, and the light source printed circuit board 631 is connected to an external backlight driving circuit through the connector.

The point light source package 633 is packaged on the light source printed circuit board 631 at a certain interval and electrically connected with the backlight driving signal line, whereby the point light source package 633 emits light through a backlight driving signal supplied from the backlight driving signal line. The point light source package 633 may include a light emitting diode driving chip.

The light diffusion lens 635 is packaged on the light source printed circuit board 631 to cover the point light source package 633. The light diffusion lens 635 disperses center luminance of the light source modules 630 by diffusing light emitted from the point light source package 633 to prevent a hot spot from occurring and increase an emission area of light. For example, the light diffusion lens 635 may have, but not limited to, a sectional shape such as a semi-sphere shape and a semi-sphere shape of which center is concave. The light diffusion lens 635 may be formed to have a shape that may diffuse light.

The interval D1 between the plurality of light source modules 630 may be defined as a pitch between centers of the point light source packages 633 which are adjacent to each other. This interval D1 may be set in accordance with an optical gap between the upper surface of the light source printed circuit board 631 and the diffusion sheet 650, whereby luminance of the display panel 100 may uniformly be provided to the entire area.

The reflective sheet 640 is attached to the bottom support 611 of the lower cover 610 and the inner inclined surface of the panel support frame 200. The reflective sheet 640 serves to reflect light, which is emitted from the plurality of light source modules 630, toward the display panel 100.

Although not shown, a plurality of reflective patterns of which sizes and intervals are different from one another may be formed on the reflective sheet 640. The light emitted from the plurality of light source modules 630 moves toward the display panel 100 by means of the reflective patterns.

The reflective sheet 640 may be made of, but not limited to, a polyester (PET) film, and may be made in a plate shape in which a plurality of reflective patterns are formed. Also, the reflective sheet 640 may be formed of a multi-layered structure in which a film type reflective sheet 640 is attached onto a plastic plate.

The diffusion sheet 650 is arranged below the display panel 100 to cover the bottom support 611 of the rear cover 610 and diffuses incident light from the plurality of light source modules 630. This diffusion sheet 650 substitutes for the related art diffusion plate, and is formed at a thickness relatively thinner than the related art diffusion plate to include at least one of a haze, a light diffusion pattern and a light diffusion member.

The optical sheet portion 670 is arranged on the light source modules 630 and irradiates incident light from the light source modules 630 to the display panel 100 by improving luminance property of the light.

The optical sheet portion 670 may include, but not limited to, a lower diffusion sheet, a prism sheet, and an upper diffusion sheet. The optical sheet portion 670 may be comprised of combination of two or more selected from a diffusion sheet, a prism sheet, a dual brightness enhancement film and a lenticular sheet.

The optical sheet portion 670 serves to move light toward the display panel 100 by condensing and diffusing the light, whereby luminance of the display panel 100 may be increased.

Figure 7A:
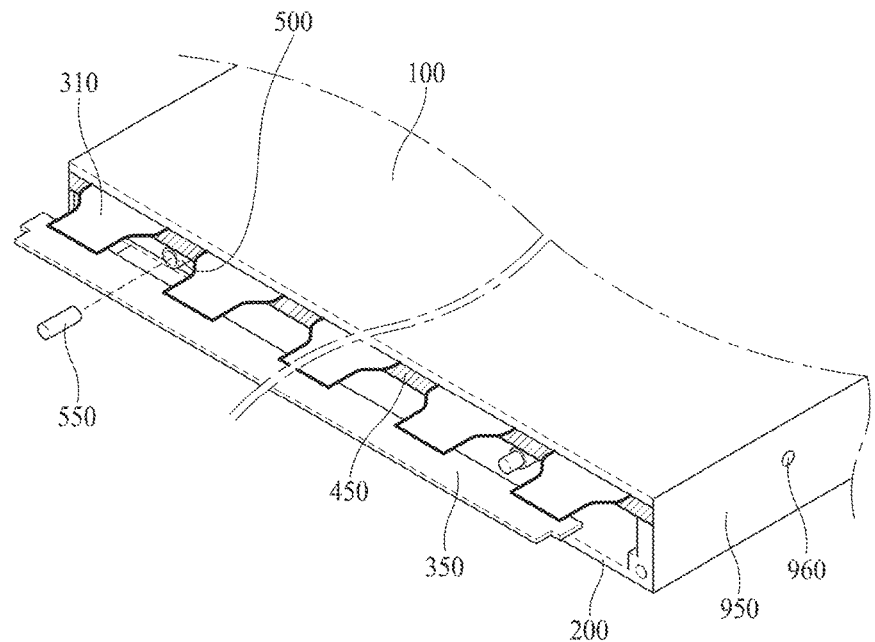
FIGS. 7A to 7C are views illustrating an assembly process of a display device according to one embodiment of the present disclosure.
Figure 7B:
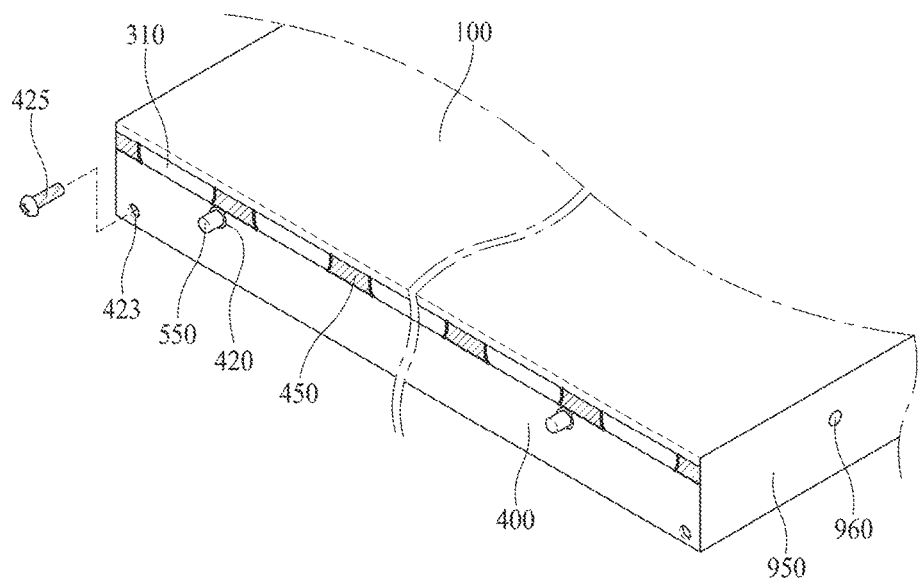
Figure 7C:
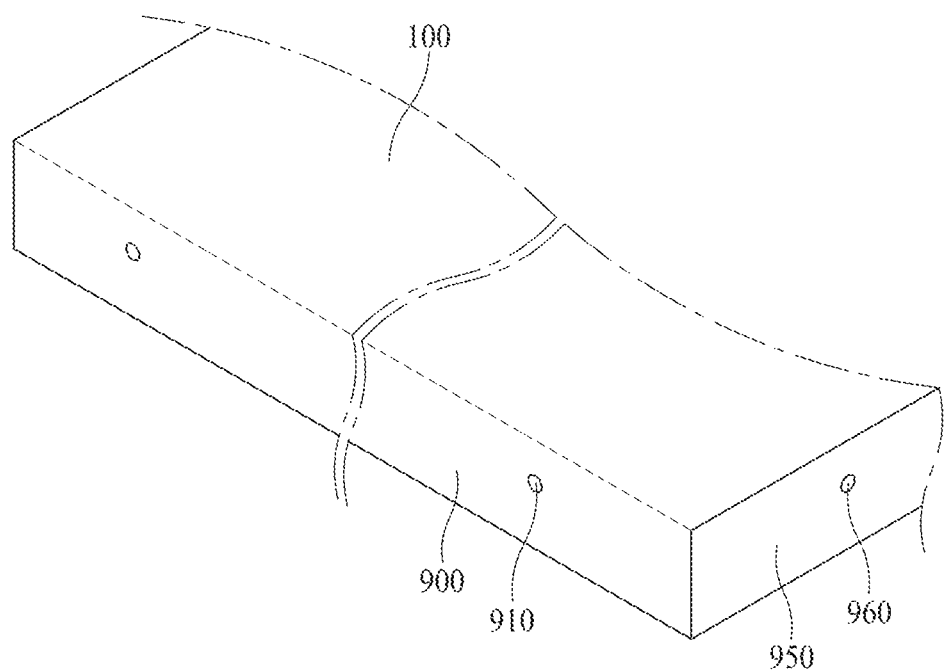

FIGS. 7A to 7C are views illustrating an assembly process of a display device according to one embodiment of the present disclosure, and relate to an assembly process of the protective film 450, the cover shield 400, and the side cover film 900 in an assembly process of the aforementioned display device of FIG. 2. Therefore, the same reference numbers will be used throughout the drawings to refer to the same or like parts, and repeated description in material and structure of each element will be omitted.

First of all, referring to FIG. 7A, the protective film 450 is attached to one side of the panel support frame 200. The protective film 450 is attached to the panel support frame 200 disposed on the plurality of guide protrusions 500 based on the plurality of guide protrusions 500. In this case, the protective film 450 is not overlapped with the guide protrusions 500. The guide member 550 may be inserted into the plurality of guide protrusions 500. The guide member 550 is fastened to the plurality of guide protrusions 500 and guides the attachment position of the protective film 450 to more accurately attach the protective film 450.

Then, referring to FIG. 7B, the cover shield 400 is assembled in one side of the panel support frame 200. In this case, the cover shield 400 is fixed to the panel support frame 200 so that the plurality of guide protrusions 500 and the guide member 550 pass through the through portion 420 of the cover shield 400. Then, the fastening member 425 fastened to the fastening hole 423 to fix the lower portion of the cover shield 400 to the panel support frame 200. Therefore, the cover shield 400 may accurately be assembled in the panel support frame 200 without distortion. At this time, the lower portion of each of the plurality of flexible circuit films 310 and the printed circuit board 350 are received in the receiving portion 230.

Since the cover shield 400 may be guided sufficiently by the plurality of guide protrusions 500 during the process of assembling the cover shield 400 and the panel support frame 200, the guide member 550 may not be used. However, if the guide member 550 is provided, the cover shield 400 and the panel support frame 200 may be assembled more easily.

Finally, referring to FIG. 7C, the side cover film 900 covers one side of the display panel 100, the plurality of flexible circuit films 310 and the cover shield 400. In this case, the guide member 550 passes through each of the plurality of guide holes 910 provided in the side cover film 900. Therefore, the side cover film 900 may accurately be attached without being protruded toward the upper surface of the display panel 100 and the lower surface of the cover shield 400. The guide member 550 is removed after attaching the side cover film 900.

Figure 8:
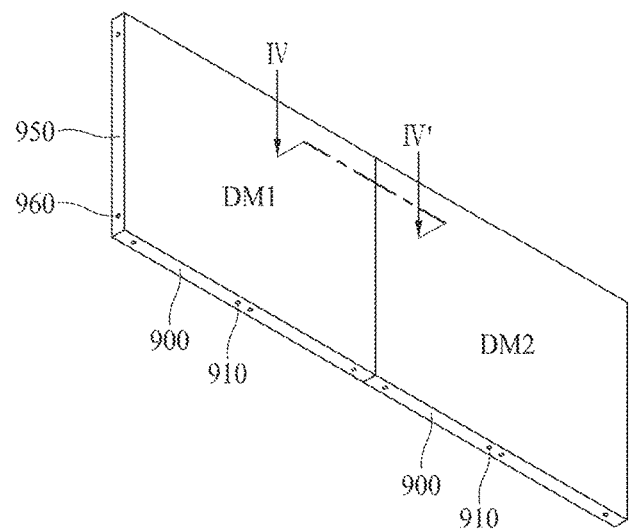
FIG. 8 is a view illustrating a multi display device according to the first embodiment of the present disclosure.
Figure 9:
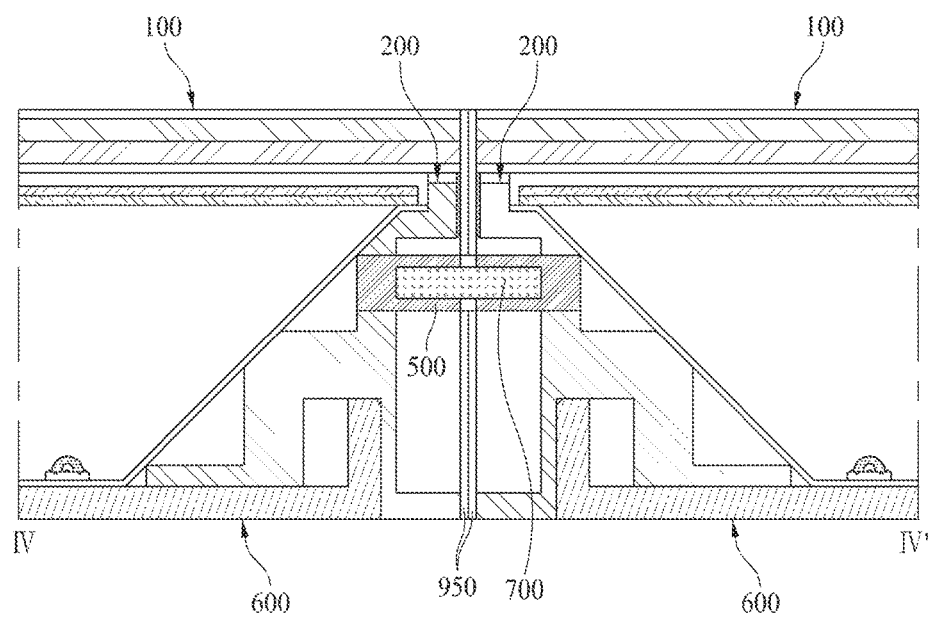
FIG. 9 is a cross-sectional view illustrating a section taken along line IV-IV' shown in FIG. 8 according to one embodiment of the present disclosure.

FIG. 8 is a brief view illustrating a multi display device according to the first embodiment of the present disclosure, FIG. 9 is a cross-sectional view illustrating a section taken along line IV-IV' shown in FIG. 8 and illustrates that the aforementioned display devices according to one embodiment of the present disclosure are connected with each other from side to side. Therefore, the same reference numbers will be used throughout the drawings to refer to the same or like parts, and repeated description in material and structure of each element will be omitted.

Referring to FIGS. 8 and 9, the multi display device according to the first embodiment includes a first display module DM1, a second display module DM2, and a connection member 700.

The first display module DM1 has the same elements as those of the aforementioned display device. Therefore, auxiliary side cover films 950 are attached to a side of the first display module DM1, and each of the auxiliary side cover films 900 has a plurality of auxiliary guide holes 960 respectively overlapped with the plurality of guide protrusions 500 additionally provided at the other sides except one side of the panel support frame 200.

The second display module DM2 has the same elements as those of the first display module DM1. The second display module DM2 is laterally coupled to one side of the first display module DM1. In this case, auxiliary guide holes 960 provided in each of the first display module DM1 and the second display module DM2 are arranged to face each other.

The connection member 700 connects the first display module DM1 and the second display module DM2 with each other. The connection member 700 is coupled to the guide protrusions 500 provided in each of the first display module DM1 and the second display module DM2. In this case, the guide protrusions 500 have an insertion groove 555, and the connection member 700 is inserted into the insertion groove 555.

Since the guide protrusions 500 are provided in each of the first display module DM1 and the second display module DM2, the first display module DM1 and the second display module DM2 may easily be coupled to each other even without separate alignment.

Figure 10:
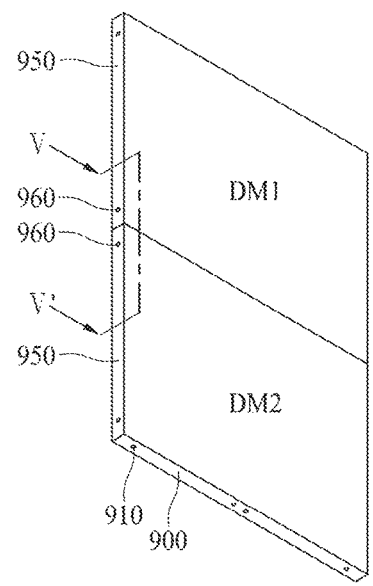
FIG. 10 is a view illustrating a multi display device according to the second embodiment of the present disclosure.
Figure 11:
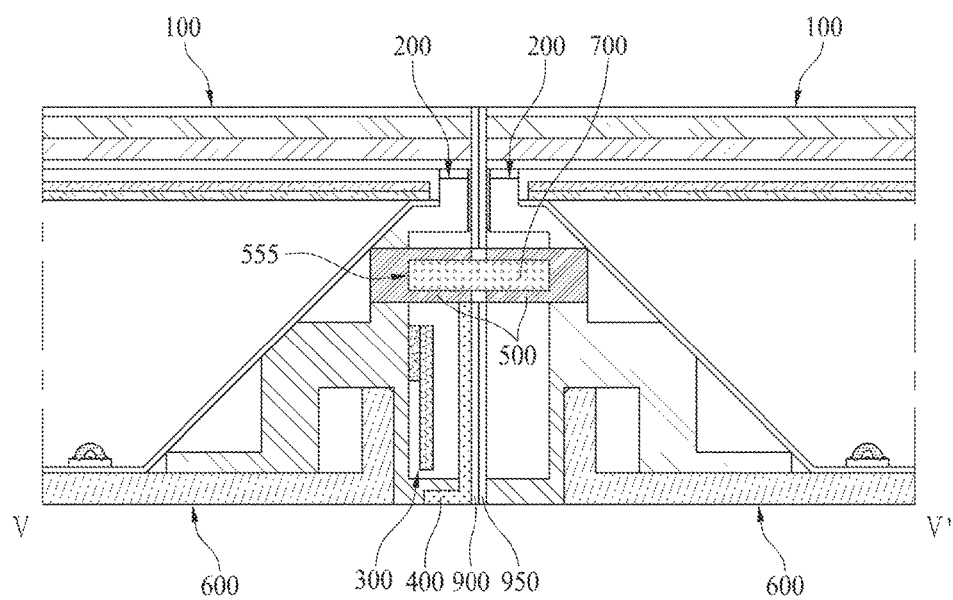
FIG. 11 is a cross-sectional view illustrating a section taken along line V-V' shown in FIG. 10 according to one embodiment of the present disclosure.

FIG. 10 is a view illustrating a multi display device according to the second embodiment of the present invention, and FIG. 11 is a cross-sectional view illustrating a section taken along line V-V' shown in FIG. 10 and illustrates that the aforementioned display devices according to one embodiment of the present disclosure are connected with each other up and down. Therefore, the same reference numbers will be used throughout the drawings to refer to the same or like parts, and repeated description in material and structure of each element will be omitted.

Referring to FIGS. 10 and 11, the multi display device according to the second embodiment includes a first display module DM1, a second display module DM2, and a connection member 700.

The side cover film 900 is attached to one side of the first display module DM1, and has a plurality of guide holes 910 respectively overlapped with the plurality of guide protrusions 500 provided at one side of the panel support frame.

A plurality of auxiliary side cover films 950 are attached to a side of the second display module DM2, and each of the plurality of auxiliary side cover films 950 has a plurality of auxiliary guide holes 960 respectively overlapped with the plurality of guide protrusions 500 additionally provided at the other sides except one side of the panel support frame 200.

The first display module DM1 and the second display module DM2 are coupled to each other up and down. Therefore, each of the guide holes 910 of the first display module DM1 and each of the auxiliary guide holes 960 are arranged to face each other.

The connection member 700 connects the first display module DM1 and the second display module DM2 with each other. The connection member 700 is inserted into the guide protrusions 500 provided in each of the first display module DM1 and the second display module DM2.

Since the guide protrusions 500 are provided in each of the first display module DM1 and the second display module DM2, the first display module DM1 and the second display module DM2 may easily be coupled to each other even without separate alignment.

Figure 12:
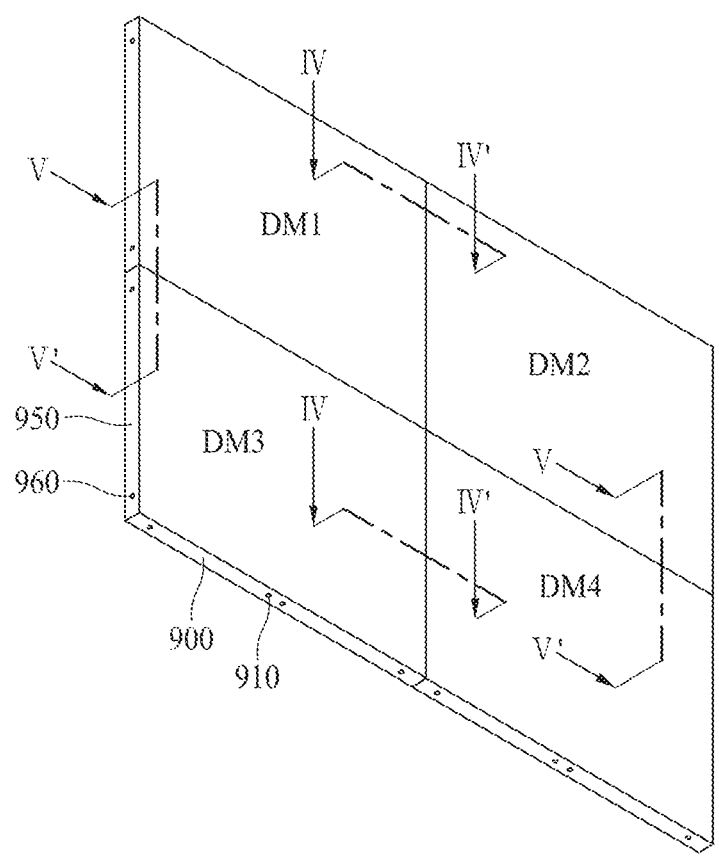
FIG. 12 is a view illustrating a multi display device according to the third embodiment of the present disclosure.

FIG. 12 is a brief view illustrating a multi display device according to the third embodiment of the present disclosure, and illustrates that the aforementioned display devices according to one embodiment of the present invention are connected with each other up and down and from side to side. Therefore, a cross-sectional view taken along line IV-IV' shown in FIG. 12 is the same as that of the multi display device according to the first embodiment of the present disclosure described with reference to FIG. 9, and a cross-sectional view taken along line V-V' shown in FIG. 12 is the same as that of the multi display device according to the second embodiment of the present invention described with reference to FIG. 11. Therefore, the same reference numbers will be used throughout the drawings to refer to the same or like parts, and repeated description in material and structure of each element will be omitted.

Referring to FIG. 12, the multi display device according to the third embodiment includes a first display module DM1, a second display module DM2, a third display module DM3, a fourth display module DM4, and a connection member 700.

The first display module DM1 is coupled to the second display module DM2 from side to side, and is coupled to the third display module DM3 up and down. In this case, the connection member 700 is provided between the first display module DM1 and the second display module DM2 to connect the first display module DM1 with the second display module DM2. Also, the connection member 700 is provided between the first display module DM1 and the third display module DM3 to connect the first display module DM1 with the third display module DM3.

The second display module DM2 is coupled to the fourth display module DM4 up and down. In this case, the connection member 700 is provided between the second display module DM2 and the fourth display module DM4 to connect the second display module DM2 with the fourth display module DM4.

The third display module DM3 is coupled to the fourth display module DM4 from side to side. The connection member 700 is provided between the third display module DM3 and the fourth display module DM4 to connect the third display module DM3 with the fourth display module DM4.

In this specification, although the present disclosure has been described based on the liquid crystal display device as an example, the present disclosure is not limited to the liquid crystal display device and may be applied to various display devices, for example, an organic light emitting display device.

According to the present disclosure, the following advantages can be obtained.

Since the flexible circuit films are attached to one side of the display panel, it is not required to externally expose the signal line unlike the related art. Therefore, the bezel area may be reduced as compared with the display device of the related art.

Also, since the plurality of guide protrusions guide the attachment position of the protective film and the side cover film, attachment accuracy of the protective film and the side cover film may be improved. Also, after the cover shield is primarily fixed to the panel support frame by the plurality of guide protrusions, the cover shield and the panel support frame are assembled to each other. Therefore, distortion of the cover shield, which is caused during the assembly process may be avoided. As a result, assembly accuracy of the cover shield may be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a display panel comprising signal lines and configured to display images;
   a panel support frame coupled to at least a bottom surface of the display panel to support the display panel;
   a plurality of guide protrusions inserted at predetermined locations of the panel support frame, each of the plurality of guide protrusions including an insertion groove open to receive a guide member configured to connect the display device with another display device;
   a driving circuit arranged at one side of the panel support frame, the driving circuit including:
      a printed circuit board; and
      a plurality of flexible circuit films, each of the plurality of flexible circuit films located between a pair of guide protrusions from the plurality of guide protrusions and connecting the printed circuit board to a plurality of the signal lines of the display panel;
   a cover shield covering the driving circuit at the side of the panel support frame, wherein the cover shield includes a plurality of through portions that are each aligned with a corresponding one of the plurality of guide protrusions; and
   a side cover film covering the cover shield located at the side of the panel support frame, the side cover film including a plurality of guide holes that are each aligned with a corresponding one of the plurality of guide protrusions.

2. The display device of claim 1, wherein the display panel includes a top surface that displays the images and a side surface that is substantially perpendicular to the top surface and the bottom surface, the plurality of flexible circuit films connected to the side surface of the display panel.

3. The display device of claim 1, further comprising:
   a protective film including a first surface and a second surface, the first surface connected to the panel support frame and the second surface connected to a portion of each of the plurality of flexible circuit films.

4. The display device of claim 1, wherein each of the plurality of guide protrusions is arranged between the protective film and the printed circuit board.

5. The display device of claim 1, further comprising:
   a plurality of auxiliary side cover films covering sides of the display panel other than the one side of the panel support frame where the driving circuit is arranged, each of the plurality of auxiliary side cover films including a plurality of auxiliary guide holes that are each aligned with a corresponding one of the plurality of guide protrusions.

6. The display device of claim 4, wherein the panel support frame includes:
   a sidewall portion that is connected to the display panel; and
   a receiving portion that is not connected to the display panel; and
   wherein the plurality of flexible circuit films and the printed circuit board are located between the receiving portion of the panel support frame and the cover shield.

7. The display device of claim 6, wherein the receiving portion of the panel support frame includes a plurality of protrusion holders, each of the plurality of guide protrusions inserted into a corresponding one of the plurality of protrusion holders.

8. The display device of claim 7, wherein the driving circuit further includes:
   a driving integrated circuit located between the plurality of flexible circuit films and the cover shield and connected to both the plurality of flexible circuit films and the cover shield.

9. A multi display device comprising:
   a first display module including a plurality of guide protrusions in at least one side of the first display module, each of the plurality of guide protrusions including an insertion groove;
   a second display module including a plurality of guide protrusions in at least one side of the second display module, each of the plurality of guide protrusions of the second display module including an insertion groove; and
   a plurality of guide members connecting together the first display module and the second display module, each guide member including a first end and a second end, the first end of each guide member inserted into one of the plurality of guide protrusions of the first display module and the second end of each guide member inserted into one of the plurality of guide protrusions of the second display module;
   wherein each of the first display module and the second display module comprises:
      a display panel comprising signal lines and configured to display images;
      a panel support frame coupled to at least a bottom edge of the display panel to support the display panel;
      a driving circuit arranged at one side of the panel support frame, the driving circuit comprising:
         a printed circuit board; and
         a plurality of flexible circuit films, each of the plurality of flexible circuit films located between a pair of guide protrusions and connecting the printed circuit board to a plurality of the signal lines of the display panel;
      a cover shield covering the driving circuit at the one side of the panel support frame;
      a side cover film covering the cover shield located at the one side of the display panel, the side cover film including a plurality of guide holes that are each aligned with a corresponding one of the plurality of guide protrusions wherein the plurality of guide protrusions are inserted at predetermined locations of the panel support frame.

10. The multi display device of claim 9, wherein vertical edges of the first display module and the second display module are connected to each other via the plurality of guide members.

11. The multi display device of claim 9, wherein horizontal edges of the first display module and the second display module are connected to each other via the plurality of guide members.

12. The multi display device of claim 9, wherein each of the plurality of guide members is cylindrically shaped.

13. The multi display device of claim 9, wherein the display panel includes a top surface that displays images and a side surface that is substantially perpendicular to the top surface and a bottom surface, the plurality of flexible circuit films connected to the side surface of the display panel.

14. The multi display device of claim 9, wherein each of the first display module and the second display module further comprises:
    a protective film including a first surface and a second surface, the first surface connected to the panel support frame and the second surface connected to a portion of each of the plurality of flexible circuit films.

15. The multi display device of claim 14, wherein each of the plurality of guide protrusions is arranged between the protective film and the printed circuit board.

16. A multi display device comprising:
    a plurality of display modules having a plurality of guide protrusions in at least one side of a panel support frame, the guide protrusions including an insertion grooves; and
    a plurality of connection members connecting the plurality of display modules together, the connection members are coupled to the guide protrusions in each of the plurality of display modules and the connection members are inserted into the insertion grooves;
    wherein the plurality of guide protrusions are provided in each side except one side of the panel support frames of the plurality of display modules so that the plurality of display modules are coupled together from side to side or up and down without separate alignment process;
    wherein each of the plurality of display modules further comprises:
        a display panel and a plurality of flexible circuit films, the plurality of flexible circuit films are attached to one side of the display panel so that a bezel area of the display module is reduced;
        protective film between the panel support frame and the plurality of flexible circuit films, the plurality of flexible circuit films is prevented from being damaged by the panel support frame; and
        a cover shield at one side of the panel support frame, the cover shield receives each of the plurality of flexible circuit films and a printed circuit board.

17. The multi display device of claim 16, wherein the protective film is not overlapped with the guide protrusions.

18. The multi display device of claim 16, wherein each of the display modules further comprises a side cover film surrounding the side of the display module, configured to prevent external light from entering the display device and light leakage at a joint portion of the multi display device.

19. The multi display device of claim 18, wherein the plurality of guide protrusions are between the protective film and the printed circuit board to guide the attachment position of the protective film.

* * * * *